United States Patent
Dickson et al.

(10) Patent No.: US 7,099,345 B2
(45) Date of Patent: Aug. 29, 2006

(54) METHOD AND SYSTEM FOR BUFFERING A DATA PACKET FOR TRANSMISSION TO A NETWORK

(75) Inventors: Robert A. Dickson, Harvard, MA (US); Farroukh Touserkani, Acton, MA (US); Thomas P. Webber, Petersham, MA (US); Hugh Kurth, Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 966 days.

(21) Appl. No.: 09/995,356

(22) Filed: Nov. 27, 2001

(65) Prior Publication Data

US 2003/0099251 A1    May 29, 2003

(51) Int. Cl.
*H04L 12/54* (2006.01)
*H04L 12/28* (2006.01)

(52) U.S. Cl. .................. 370/429; 370/352; 370/395.72; 710/27; 711/219

(58) Field of Classification Search ................. 370/352, 370/395.71, 395.72, 412, 429; 710/23, 27, 710/33, 306; 708/209, 233, 501; 712/28, 712/29; 711/121, 154, 219
See application file for complete search history.

(56) References Cited

U.S. PATENT DOCUMENTS 6,330,631 B1 *  12/2001  Crosland ................ 710/306

* cited by examiner

*Primary Examiner*—Afsar Qureshi
(74) *Attorney, Agent, or Firm*—Park, Vaughan & Fleming, LLP

(57) ABSTRACT

Memory requests and responses thereto include a tag that has a shift value indicating the misalignment between the first byte of required packet data and the first byte of a line of data in memory. A packet buffer controller receiving data with an associated tag uses the shift value to shift the received line of data accordingly. The first line of data for the packet data payload is shifted accordingly and written into the packet buffer. Subsequent lines of data require masking the previous line of data except for the last N bytes where N equals the shift value. The shifted line of data is written over the previous line so that the lower order bytes of the shifted received line of data are written. Then the shifted line of data is written into the next line of the packet buffer. The packet buffer may be divided into sections containing alternating lines of data to increase storage speed.

7 Claims, 5 Drawing Sheets

METHOD AND SYSTEM FOR BUFFERING A DATA PACKET FOR TRANSMISSION TO A NETWORK

TECHNICAL FIELD

The present invention relates to a system and method for building data packets for transmission to a network.

BACKGROUND ART

Many system busses are cache line-oriented and do not support memory requests beginning at arbitrary byte locations. Each memory request fetches an entire cache line by addressing the first byte of the line. Packets transmitted on a network, however, include a payload of data which can begin at any arbitrary byte address. Thus, if the packet payload is to begin with a byte of data in the middle of a cache line, extra complexity is involved in building a packet. When data is returned from memory as a line, the network adapter needs to be instructed to copy only the desired data into a temporary buffer which we call herein a packet buffer. A packet buffer is organized with lines of data beginning at the first byte of the packet payload which is not necessarily the first byte of a cache line. When the logic unit that makes the memory request is different from the logic unit that controls the packet buffer, it is typically necessary to first communicate an indication of the difference between the first byte of the packet payload and the first byte of a cache line. Thereafter, memory requests can be made and the packet buffer can be properly loaded.

If the first byte of the packet payload is not the first byte of the cache line, the cache line after shifting will need to be split across two line locations in the packet buffer. In a conventional packet buffer that receives a line of data at a time, two write cycles will be needed to store a cache data line in the packet buffer.

SUMMARY OF THE INVENTION

Lines of data are stored in memory. When building a packet payload, a memory access system determines a shift value that corresponds to any misalignment between the first byte in a line of data in memory and the first byte in the data desired for the packet payload. In accordance with an embodiment of the invention, the shift value is incorporated into a tag which is part of a read request for data from memory. A packet buffer control system receives a line of data from memory responsive to the read request. The response from memory also conveniently includes the tag with the shift value. The packet buffer controller shifts the received line of data for storage in a packet buffer in accordance with the shift value.

In accordance with an embodiment of a method of loading a first line of data into a packet buffer, the first line of data is received along with a tag indicating a shift value (N). At least those bytes of data following the first N bytes of data are written into the packet buffer, where N equals the shift value. A mask is set up to prevent overwriting those bytes of data that followed the first N bytes in the line of data.

In accordance with an embodiment of a method for loading a line of data into a packet buffer, preferably a line of data is received from memory along with a tag indicating a shift value. The line of data is shifted in accordance with the shift value in the tag and the shifted line of data is written into the packet buffer. Writing is preferably performed by writing bytes of the shifted line of data that are in unmasked positions of the packet buffer while bytes of the shifted line of data in masked positions of the packet buffer do not make changes to the masked positions of the packet buffer. The shifted line of data is then written into the packet buffer for a second time. A mask is set up for bytes in the packet buffer across the width of the buffer except for the last N bytes where N equals the shift value.

In accordance with embodiments of the present invention, a tag including a shift value is included in a memory request and is passed along to a packet buffer controller in response to the request. It is therefore unnecessary to coordinate a separate communication between the memory request unit and the packet buffer controller to indicate the shift value. The tag may further include a unique identifier so that responses can be put in proper sequence at the packet buffer controller regardless of the order in which the responses are received.

In accordance with an embodiment of the present invention, a packet buffer is divided into two sections. A shifted line of data is input to each of the two sections of the packet buffer in the same clock cycle. The shifted line of data is written into each section in the same clock cycle with a mask applied so that data previously written into the buffer is not overwritten. A data line is read alternately from each of the two sections, so that the data may be transmitted to the network in the proper order.

Other objects and advantages of the invention will become apparent during the following description of the presently preferred embodiments of the invention taken in conjunction with the drawings.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
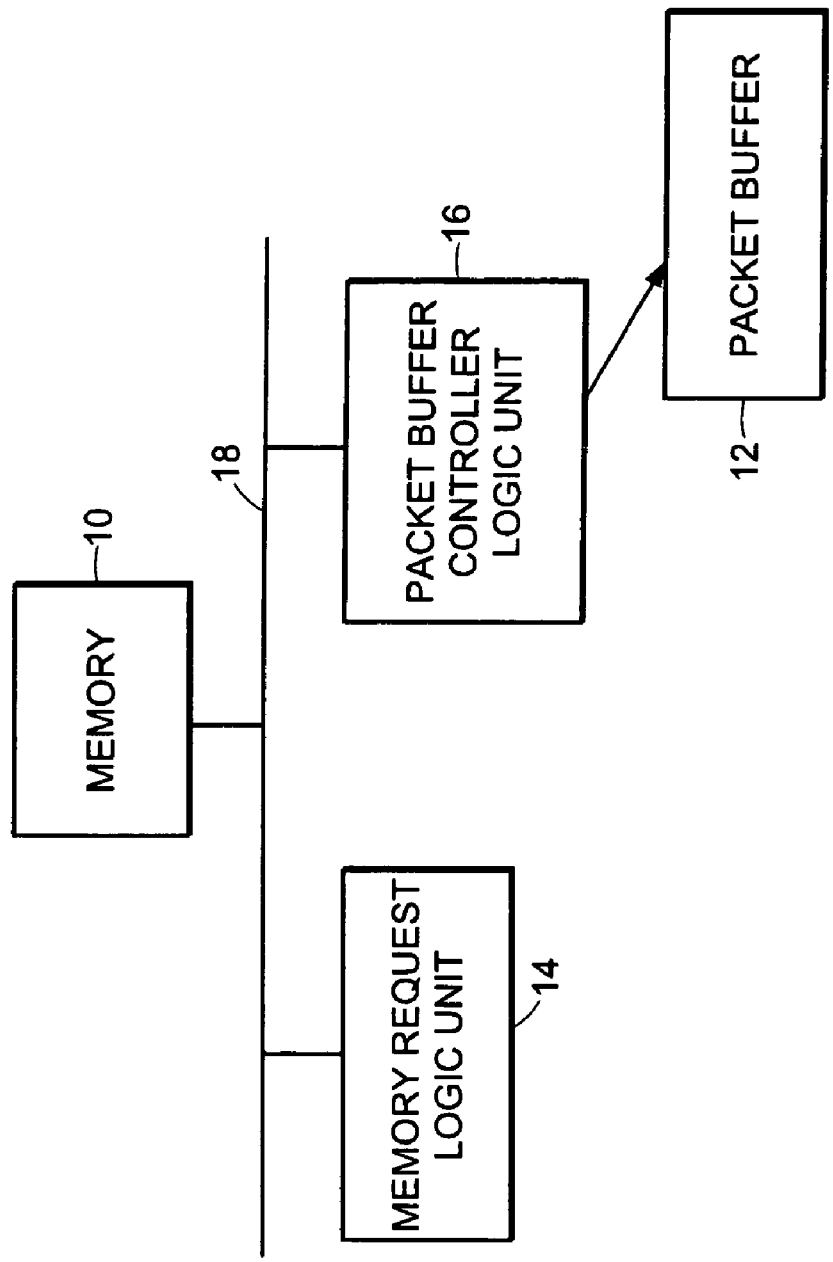
FIG. 1 is a schematic block diagram of a system for building packets of an embodiment of the invention.

Embodiments of the present invention are typically for use in a system in which data is stored in lines in a memory 10 and data read from the memory is used to fill a packet buffer 12 to form a packet payload. Memory is accessed by a system component referred to herein as the memory request logic unit 14. The memory request logic unit is that portion of a system that sends read requests to the memory 10 for obtaining data to fill a packet payload. When a memory request logic unit 14 receives instructions to build a packet payload, it is given a starting address in memory and a length for the packet payload data. In a system that permits a misalignment between the data for use in the packet payload and the lines of data as stored in memory, the memory request logic unit 14 must determine the shift value. The shift value is the number of bytes from the start of a line in memory to the start of the data for use in the packet payload. Memory can be arranged such that the last three bits in the memory address for each line is 000. This is particularly useful in a memory arranged with lines of eight bytes. The shift value can be easily obtained by merely extracting the last three bits from the starting address. Another more complicated way of obtaining the shift value would be to use subtraction between a known starting address for a line of data and the starting address for the packet payload data.

In an embodiment of the invention, a read request formed by the memory request logic unit includes a tag. The tag is a field in the request that contains data that is understandable by at least the memory request logic unit 14 and a corresponding packet buffer controller logic unit 16 used to fill the packet buffer. It is not necessary for any other components using the memory bus 18 to have a comprehension of the bits within the tag field. Indeed, other units of the memory bus may use a similarly located tag field for different purposes. It is only necessary for a memory request logic unit 14 and its associated packet buffer controller logic unit 16 to agree ahead of time as to the meaning of the bits in the tag field. In this manner, the tag field can be used for other purposes by other logic blocks in the system. In accordance with one embodiment of the invention, a tag is application specific and only has meaning to the logic block originating it and the destination logic block.

Another useful piece of information to include in the tag of a read request is a unique identifier for the read request. Typically a read request asks for a single line of data from memory. A packet payload often includes more data than is included in the single line of data from memory. Therefore, several read requests are used to fill a packet payload. A unique identifier in the tag of each of these read requests helps provide the appropriate order for the retrieved data. A simple method for assigning unique identifiers is to begin with 0001 and increment the field for each subsequent request. By including the tag in the response, the component receiving the data from memory will be able to order the data from memory based on the unique identifiers rather than upon the order in which data is received.

The packet data payload is built in a packet buffer 12. The packet buffer 12 may be a series of registers each of a width for holding a line of data. A packet buffer controller 16 receives a line of data from memory along with its tag. The packet buffer controller logic unit 16 uses the shift value in the tag to set the amount of bytes for shifting the received line of data. Shifting may be accomplished in a wrap-around shift register in the packet buffer controller logic unit 16. Shifting accomplishes putting the first byte of the packet data line at the beginning of the register for writing into the packet buffer 12.

Figure 2:
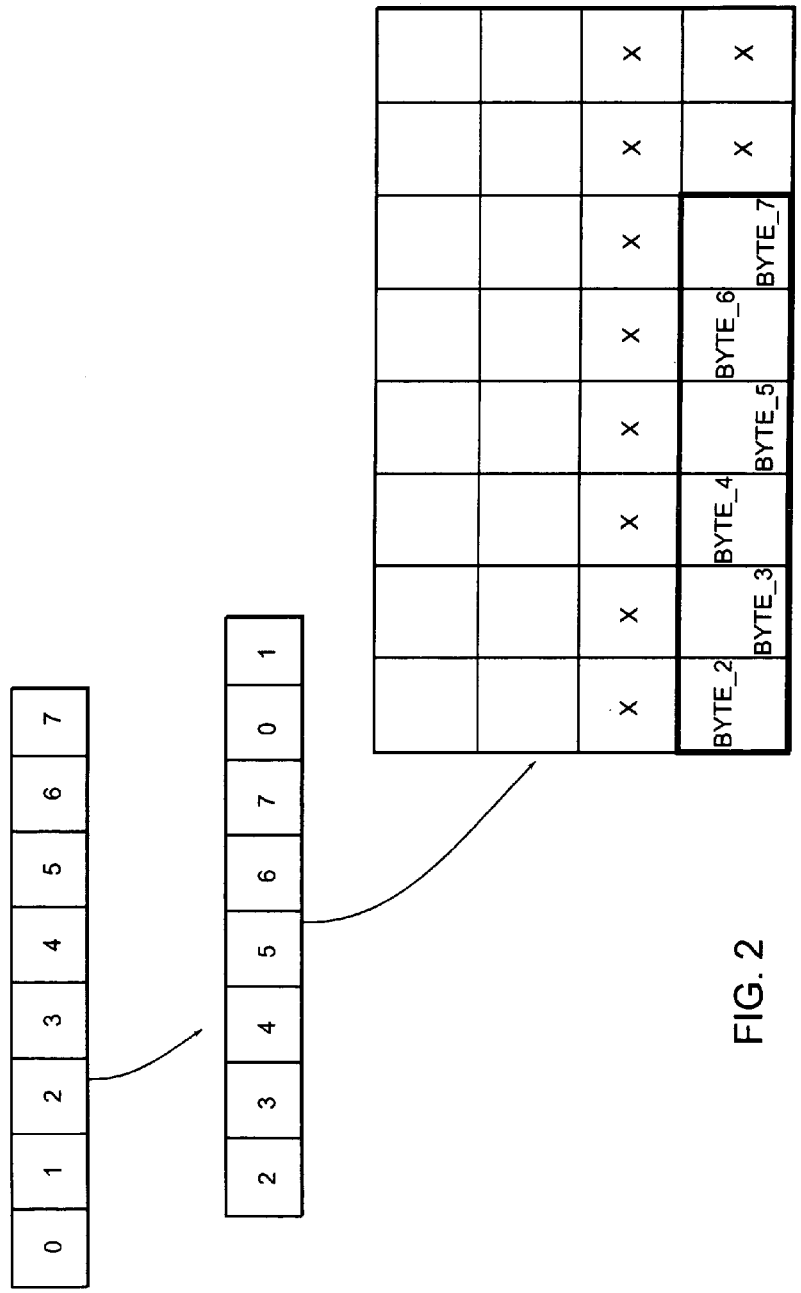
FIG. 2 is a schematic illustration of a method of an embodiment of the invention for loading a first line of data into a packet buffer.

Referring now to FIG. 2, the operation of the packet buffer controller logic unit 16 is schematically shown. A received line of data from memory includes the bytes of data as stored in memory from byte 0 sequentially through byte 7. An example is shown where the shift value received by the packet buffer controller logic unit was a 2. The wrap-around shift register shifts the received line of data 2 bytes to the left. Thus, the third byte (byte 2) is now at the beginning of the line of data to be written into the packet buffer. This is the first line of data for the packet payload being written into the packet buffer. For a shift value of 2, it is only necessary to write the bytes following the first two bytes of the received line into the packet buffer. In most cases, however, it will be simpler to write the entire shifted line into the packet buffer. A mask is then set up to prevent overwriting of the bytes that follow the first 2 bytes. Therefore, in FIG. 2, bytes numbered 2–7 in a shifted line of data are masked from being overwritten. The first two bytes, 0 and 1, are written into the packet buffer but are not masked so that they may be overwritten as they are not needed in the packet data payload. Masking is accomplished in a conventional manner. A mask bit is set for each byte in a register of the packet buffer. The mask bits are used as an input to flip-flops or multiplexers involved in the write operation from the packet buffer controller logic unit 16 to the packet buffer 12. A mask bit input determines whether or not a particular byte of data will or will not be written into the packet buffer. In an example implementation, each byte in the packet buffer 12 has a multiplexor supplying the byte to be written therein. The inputs to the multiplexor are the old contents of the packet buffer and the new byte from the packet buffer controller logic unit 16. The mask bit for the byte in the packet buffer 12 is the selection input to the multiplexor. If a byte has been masked, the mask bit selects the old contents. If the byte has not been masked, the mask bit selects the new byte.

Figure 3:
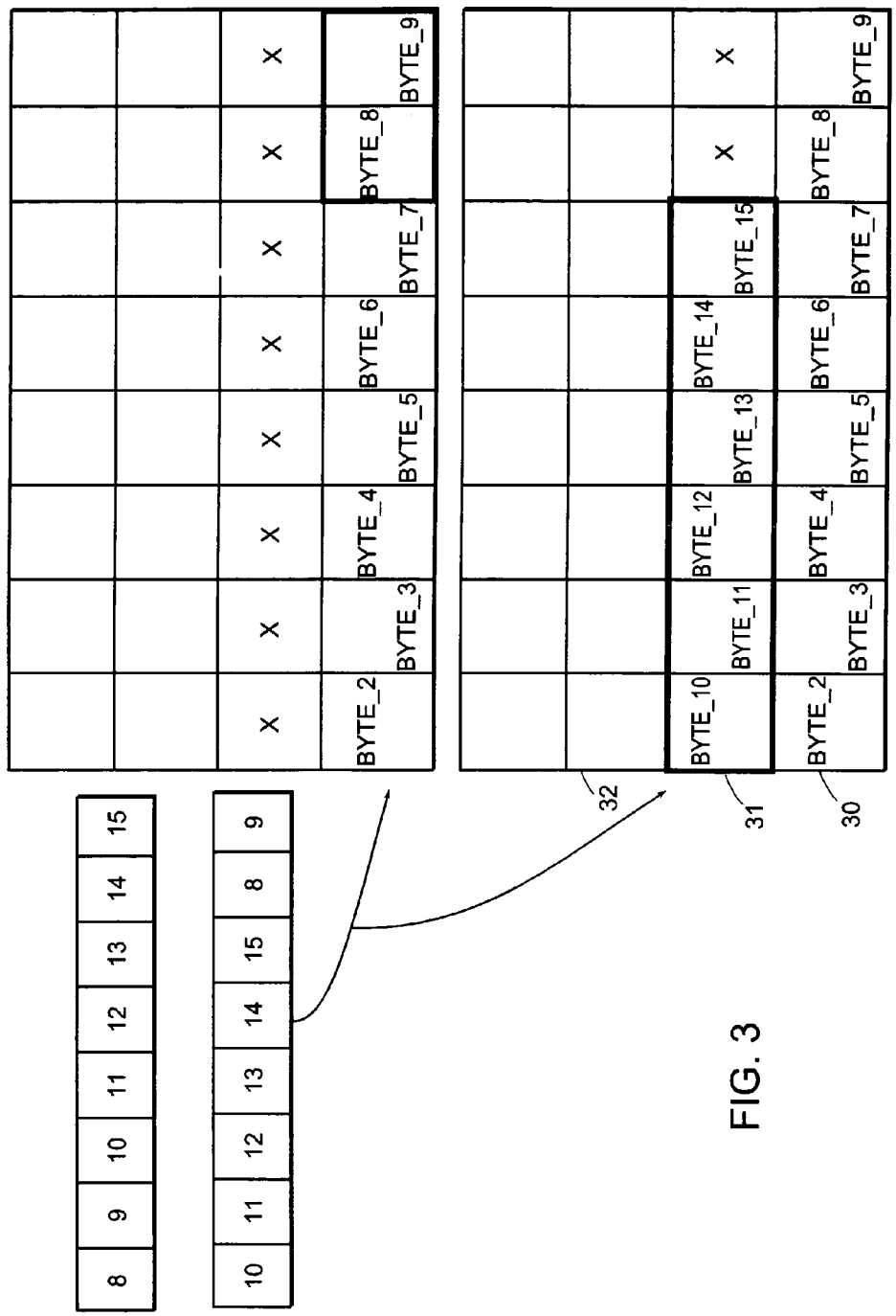
FIG. 3 is a schematic illustration of a method of an embodiment of the invention for loading a line of data into a packet buffer.

Subsequent lines of data received for input into the packet data payload may be handled in accordance with a method as illustrated in FIG. 3. A line of data in memory is received along with its tag indicating a shift value. A tag may also include a unique identifier used to put the received lines of data in the appropriate sequence for writing into the packet buffer. The shift value in the tag is used to shift the received line of data accordingly. As shown in FIG. 3, the received line of data includes bytes 8–15 to the memory. For the shift value 2, the line of data is shifted to the left two bytes so that it now begins with byte 10. Preparation of the mask to protect the existing bytes in the buffer is completed. The mask protects data across the width of the buffer except for the last N bytes where N equals the shift value. The shifted line of data is written into the packet buffer over the previous written line of data 30. Bytes 8 and 9 are in unmasked positions of the packet buffer. Thus, bytes 8 and 9 are written over the unmasked bytes into the packet buffer. Bytes 10–15 are in masked positions of the packet buffer and they make no changes to the masked positions of the packet buffer. In this manner, the desired data from the packet data payload is written in the appropriate sequence to the packet buffer. The buffer word pointer advances to the next word 31. The shifted line of data is written a second time into the packet buffer in the following register. In this manner, bytes 10–15 are transferred into the packet buffer. Bytes 8 and 9 are also written into the packet buffer for a second time but are not needed. A mask will be set up to preserve bytes 10–15 while leaving bytes 8 and 9 unmasked.

After all of the received lines of data have been written into the packet buffer in the order prescribed by the unique identifiers, the packet data payload is complete. The packet data payload is made available from the packet buffer for subsequent transmission as a packet. By including a tag field in the memory read request and the response to that request and including a shift value in that tag field that is understandable to the memory request unit and packet buffer controller unit, lines of data are written into the packet buffer properly despite any misalignment between the starting address for the packet data and the starting address for the corresponding line of data from memory. This approach for building packets is described in commonly owned U.S. patent application, System and Method for Building Packets, Ser. No. 09/817,509, filed Mar. 26, 2001, the full disclosure of which is hereby incorporated herein by reference in its entirety.

Figure 4:
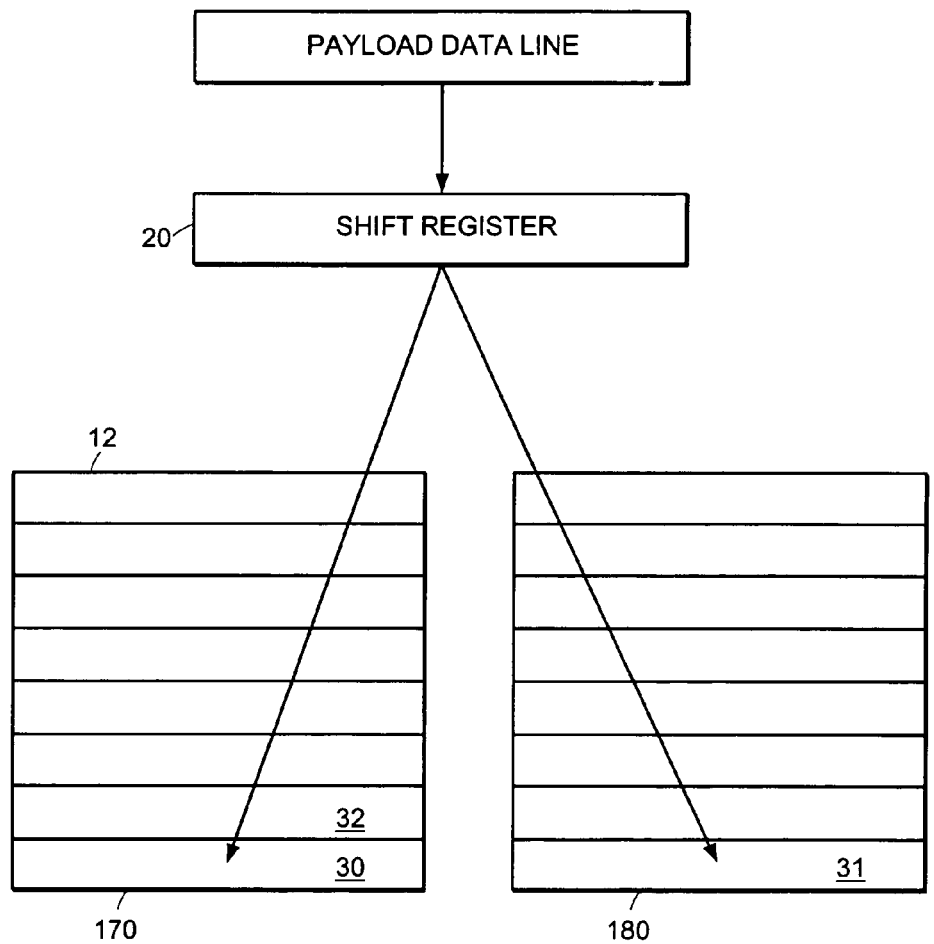
FIG. 4 is a schematic illustration of a method for loading a packet buffer according to an embodiment of the invention.

In an embodiment of the present invention, the packet buffer is divided into two sections to allow for faster loading of data words, as illustrated in FIG. 4. The packet buffer 12 is implemented as a first section 170 and a second section 180. The output of a shift register 20, or other means of shifting the bytes in the received line of data, is input to both sections of the packet buffer in the same clock cycle. Logic causes a write cycle to occur in the same clock cycle to both sections of the packet buffer, with writing enabled only for the byte positions in each section of the packet buffer that correspond to the shifted line of data. Portions of two data lines in the packet buffer (30 and 31) will be affected by the write operation, if N is non-zero. One of the data lines 30 affected is stored in the first section 170 while the other data line affected 31 is stored in the second section 180. Other byte positions in the packet buffer are left unchanged by the write operation, for example, by masking off the byte positions in each data line that will remain unchanged, as described above. The next shifted data line that is stored in the packet buffer will overwrite portions of the data line 31 just modified in the second section 180 and the next data line 32 in the first section 170. The byte positions in the packet buffer that are not affected in storing the next shifted data line can be masked, as above. Thus, the speed of writing the shifted data line into the packet buffer 12 is doubled, as compared to a packet buffer design that consists of a single memory section because both of the data lines in the packet buffer that contain bytes from the shifted payload data line may be written in the same clock cycle.

Figure 5:
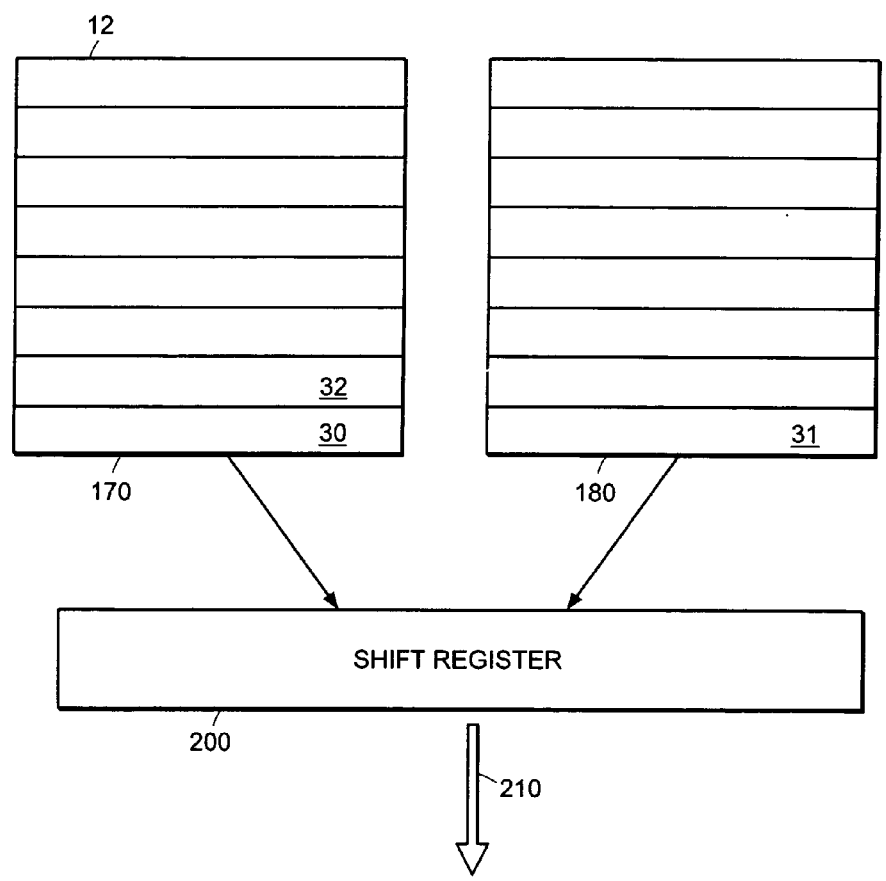
FIG. 5 is a schematic illustration of a method for reading a packet buffer to transmit data to a network according to an embodiment of the invention.

Data is retrieved from the packet buffer 12 and transmitted to the network as shown schematically in FIG. 5. Lines of data (e.g., 30 and 31) are read alternately from the first section 170 and then the second section 180 of the packet buffer 160 and input to a shift register 200. The output of the shift register 200 is an ordered sequence of bytes 210 that are transmitted to the network.

Of course, it should be understood that various changes and modifications to the preferred embodiments described above will be apparent to those skilled in the art. For example, the memory request logic unit and the packet buffer controller logic unit may be implemented in hardware or software and as separate components or as parts of a larger entity. The tags may appear in a header or in a separate field of the request devoted to tags. The packet buffer may be a large register, a series of registers or an area set aside in a random access memory.

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

These and other changes can be made without departing from the spirit and scope of the invention and without diminishing its attendant advantages. It is therefore intended that such changes and modifications be covered by the following claims.

What is claimed is:

1. A packet buffer control system comprising:

a memory storing bytes of data in lines;

a packet buffer, the packet buffer divided into a first section and a second section, each section for storing bytes of data in lines; and a packet buffer controller that receives a line of data from said memory along with a tag indicating a shift value, wherein the packet buffer controller is configured to shift said received line of data in accordance with the shift value for storage in said first section and in said second section and to store the resulting shifted line of data simultaneously in said first section and in said second section;

wherein, the packet buffer controller is configured to store the shifted line of data in the first section and in the second section in the same clock cycle.

2. The packet buffer control system of claim 1 wherein said packet buffer controller comprises a wrap-around shift register in which said received line of data is shifted for storage.

3. The packet buffer control system of claim 1 further comprising a mechanism for masking a line in said packet buffer.

4. The packet buffer control system of claim 1 wherein the packet buffer controller further includes logic that reads a first output data line from the first section and then reads a second output data line from the second section for transmission to a network.

5. A method of communicating alignment information comprising:

preparing read requests for lines of data to fill a packet payload;

obtaining a shift value corresponding to any misalignment between the lines of data and the packet payload;

sending a read request including a tag with the shift value, said tag being for inclusion in a response to the read request;

receiving at a packet buffer controller the response having a line of data and the tag; and shifting the line of data in accordance with the shift value in the tag and writing the shifted line of data into a first section and a second section of the packet buffer, wherein writing the shifted line of data into said first section and said second section occur simultaneously in the same clock cycle.

6. The method of claim 5 wherein said act of writing writes bytes of the shifted line of data that are in unmasked positions of the packet buffer into the packet buffer while bytes of the shifted line of data in masked positions of the packet buffer do not make changes to the masked positions of the packet buffer.

7. The method of claim 5 further including:

reading a first output data line from said first section and then reading a second output data line from said second section for transmission to a network.

* * * * *